United States Patent
Hodge

(10) Patent No.: US 10,728,240 B2
(45) Date of Patent: Jul. 28, 2020

(54) VARIABLE-STEP AUTHENTICATION FOR COMMUNICATIONS IN CONTROLLED ENVIRONMENT

(71) Applicant: **Global Tel*Link Corporation**, Reston, VA (US)

(72) Inventor: Stephen L. Hodge, Aubry, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/788,543

(22) Filed: Oct. 19, 2017

(65) Prior Publication Data

US 2019/0124065 A1    Apr. 25, 2019

(51) Int. Cl.
| | |
|---|---|
| *H04L 9/00* | (2006.01) |
| *H04L 29/06* | (2006.01) |
| *G06Q 20/38* | (2012.01) |
| *H04W 12/06* | (2009.01) |
| *G06Q 20/40* | (2012.01) |

(52) U.S. Cl.
CPC ......... *H04L 63/083* (2013.01); *G06Q 20/382* (2013.01); *G06Q 20/40* (2013.01); *G06Q 20/409* (2013.01); *H04L 63/0861* (2013.01); *H04L 63/102* (2013.01); *H04L 63/205* (2013.01); *H04W 12/06* (2013.01); *H04L 2463/082* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0028453 | A1* | 1/2008 | Nguyen ............... | G06F 21/335 726/9 |
| 2008/0133761 | A1* | 6/2008 | Polk .................... | H04L 63/0428 709/228 |
| 2009/0100264 | A1* | 4/2009 | Futa ...................... | H04L 9/0844 713/170 |
| 2009/0199264 | A1* | 8/2009 | Lang ...................... | G06F 21/31 726/1 |
| 2014/0282958 | A1* | 9/2014 | Salonen ............. | H04L 63/0861 726/7 |

* cited by examiner

*Primary Examiner* — Josnel Jeudy
(74) *Attorney, Agent, or Firm* — Sterne, Kessler, Goldstein & Fox P.L.L.C.

(57) ABSTRACT

A variable-step authentication system and a method for operating for performing variable-step authentication for communications in a controlled environment is disclosed. The variable-step authentication system may include a communication device and a server. The variable-step method includes steps for determining an authentication process that involves a number of authentication steps. The number of authentication steps is variable and dependent on a trust level associated with each participant in the communication.

19 Claims, 5 Drawing Sheets

VARIABLE-STEP AUTHENTICATION FOR COMMUNICATIONS IN CONTROLLED ENVIRONMENT

BACKGROUND

Field

This disclosure relates to enforcing security protocols in communications involving persons within a controlled environment through the use of variable-step authentication for each participating involved in the communications.

Background

Communications involving individuals in a controlled environment are generally subject to security protocols to verify that the communications can take place. These security protocols typically will include some form of authentication of each participant in the call including the individual in the controlled environment. Conventionally, this authentication comprises a single step regardless of the participants in the call and such a step is static such that the same authentication step is performed for subsequent calls. Employing a single step as part of the authentication for such communications is risky as the security protocol can be easily circumvented by diabolically enterprising participants.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
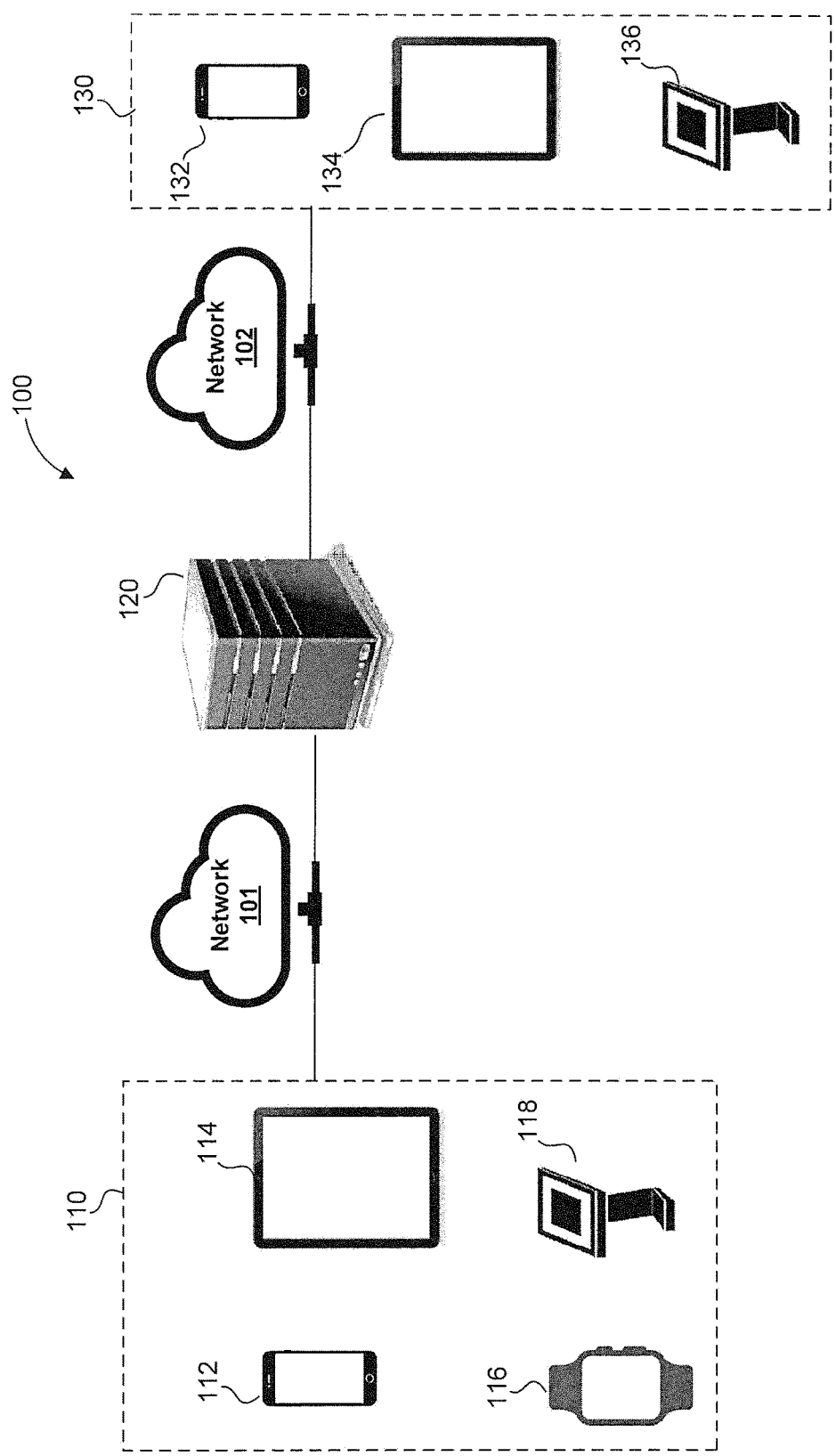
FIG. 1 illustrates a block diagram of an exemplary variable-step authentication system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

As discussed above, typical authentication for communications involving a participant who currently resides or is incarcerated within a controlled environment (e.g., an inmate) involve a single authentication step such as providing a password, passing a biometric check. Moreover, whatever authentication step is performed for a call involving certain participants, the same authentication step is likely to be performed for another call involving different participants, even if one participant (or the behavior of the one participant) is more trustworthy than another participant. That is, the authentication step is static and does not change regardless of the participants involved in the call.

Relying only a single step for authenticating communications is problematic because such a security process can be easily circumvented. This becomes especially true when the single step remains unchanged for all calls and no matter the participant. For example, a controlled environment could employ the same authentication step, such as a username/password challenge. Because this step does not change, participants can easily anticipate the security step and undertake means to overcome it, such as by providing their username/password (or any other authentication credentials) to another unauthorized party.

Therefore, there is a need for a dynamic authentication system that is capable of varying the number of authentication steps and changing the types of authentication that is performed in each step from call to call and for different participants.

Exemplary Variable-Step Authentication System

FIG. 1 illustrates a block diagram of an exemplary variable-step authentication system 100, according to embodiments of the present disclosure. variable-step authentication system 100 can be implemented in a controlled environment, such as a prison. In some embodiments, variable-step authentication system 100 includes communication devices 110, authentication server 120, and outside communication devices 130. Communication devices 110 are connected to authentication server 120 through network 101. Outside communication devices 130 are connected to authentication server 120 through network 102. Authentication server 120 acts as an intermediary through network 101 and network 102 between communication devices 110 and outside communication devices 130. Communication sessions between communication devices 110 and outside communication devices 130 include telephone calls and video conference calls.

Networks 101 and 102, may include any or all of a Local-Area Network (LAN), a Wide-Area Network (WAN), or the Internet, depending on the location of authentication server 120 in relation to communication devices 110. For example, network 101 is implemented as a LAN when authentication server 120 is co-located with communication devices 110 within the controlled environment. In another example, network 101 is implemented as a WAN or the Internet when authentication server 120 is located remotely from communication devices 110 (e.g., outside of the controlled environment). In some embodiments, authentication server 120 is cloud-based and includes one or more cloud-based servers. In some embodiments, authentication server 120 is a server within a data center that supports the wireless devices within the controlled environment. Because outside communication devices 130 are typically outside of the controlled environment, network 102 can be implemented as a WAN or the Internet because authentication server 120 will be located remotely from outside communication devices 130.

Variable-step authentication system 100 provides management of communication devices 110, such as a smartphone 112, a tablet 114, a wearable device 116, and a conference kiosk 118. A controlled environment can distribute and/or provide communication devices 110 to its inmates. Communication devices 110 are devices operated by inmates within a controlled environment and communicate directly with authentication server 120 in order to participate in communications such as with parties operating outside communication devices 130. In some embodiments, communication devices 110 can connect to network 101 through wireless connections, such as Bluetooth™ or IEEE 802.11 (commonly known as Wi-Fi). Communication devices 110 can connect to network 101 through one or more access points (not shown) that are installed in controlled environment which provide network access between communication devices 110 and authentication server 120. The access point can be implemented as any device that provides network access such as, but not limited to, a router, a modem, smartphone, a tablet, or a laptop device.

In some embodiments, authentication server 120 acts as an intermediary in communications between communication devices 110 and outside communication devices 130. Authentication server 120 performs authentication functions including implementing the variable-step authentication method described herein. For example, authentication server 120 generates participant-specific authentication procedures based on a trust level associated with each participant. In some embodiments, the trust level of a participant is stored as information in the participant's profile and, in some embodiment, is defined by a value or ranking assigned to the participants by the controlled environment. In some embodiments, the trust level of a participant, such as an inmate or an outside participant, indicates the amount of authentication steps that a participant is required to engaged with in order to join or initiate communications within variable-step authentication system 100. For example, an inmate with a higher trust level than a second inmate could be required to provide responses to more authentication steps than the second inmate. That is, based on their respective trust levels, the inmate would be required to pass a three-step authentication procedure while the second inmate would be required to pass a one or two-step authentication procedure.

Authentication server 120 also selects the types of authentication challenges to be included as the authentication step. Examples of authentication challenges include a biometric challenge, username/password challenge, and a confirmation challenge. In some embodiments, a biometric challenge would require the participant of the call to provide requested biometric information associated with the participant. Biometric information includes, for example, one or more of a finger print, a hand print, a voice sample, an iris or retinal sample, a facial image of the user (2D or 3D), a hand geometry, a signature identification, an infrared facial identification, or any other biometric as deemed appropriate. The biometric information is stored at authentication server 120 and is used to verify responses to the biometric challenge that is received from communication devices.

In some embodiments, a username/password challenge would require the participant of the call to provide a username and password that is associated with the participant. In some embodiments, a confirmation challenge would require the participant to provide a response to, for example, a challenge question or a request for a desired action. A desired action includes, but is not limited to, responding to messages, such as short message service (SMS) or emails, transmitted by authentication server 120 or providing an alphanumeric value through SMS message, email, or by voice to authentication server 120. A challenge question includes, but is not limited to, personnel questions associated with the participant.

In some embodiments, outside communication devices 130 are devices that are operated by participants that are outside of the controlled environment and include at least one of outside conference phone 132, outside conference tablet 134, and outside conference kiosk 136. In an embodiment, outside communication devices 130 may be located within the controlled environment, such as in a designated area or room of the controlled environment. Accordingly, devices can be considered outside of the controlled environment when they are operated by participants who are not incarcerated or otherwise detained within the controlled environment and/or not directly managed or controlled by the controlled environment. In another embodiment, outside communication devices 130 may be located outside of the controlled environment such as in the outsider's home. Outside communication devices 130 connect to authentication server 120 via network 102, which may include any or all of a WAN, the Internet, and/or a Public Switched Telephone Network (PSTN). The WAN may facilitate communications with other nearby prisons, such as those within the same county, state, etc.

Exemplary Authentication Server

Figure 2:
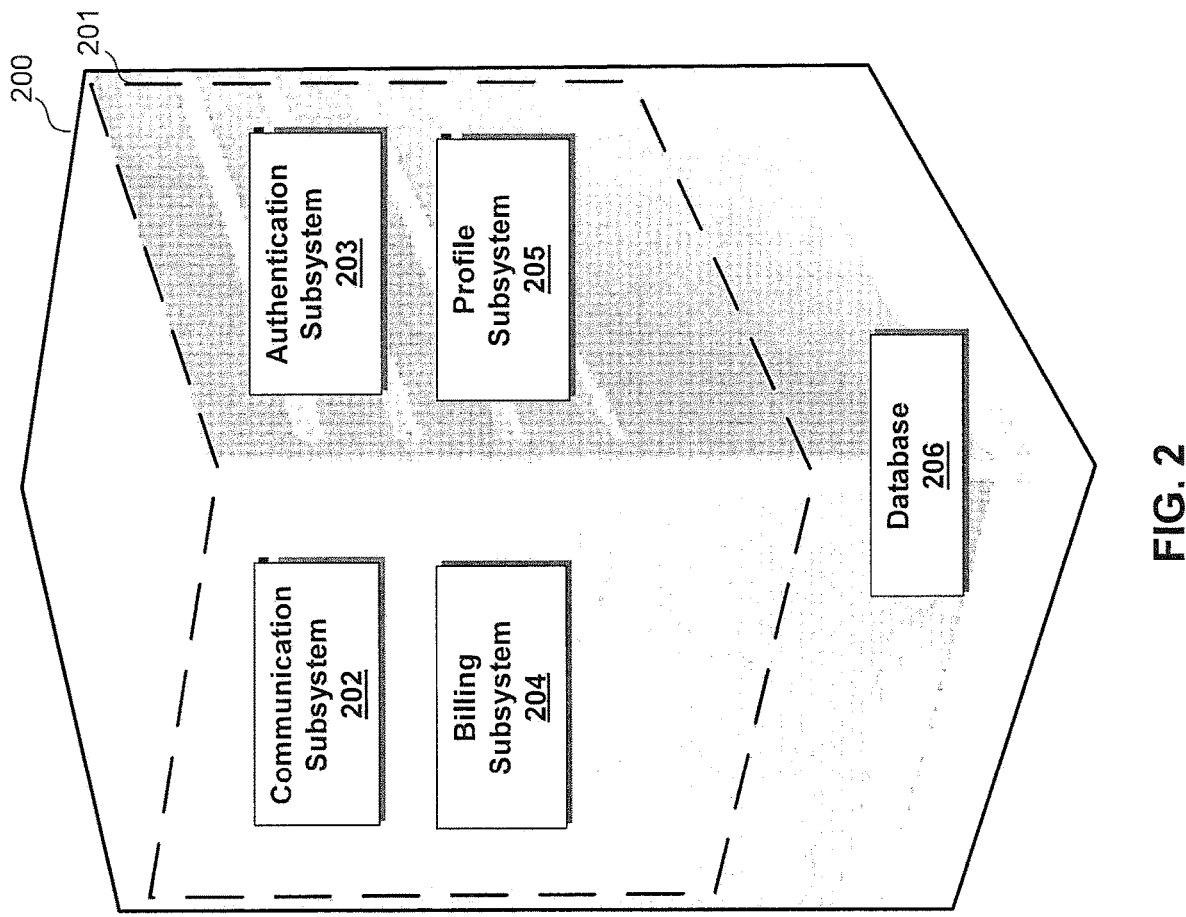
FIG. 2 illustrates an exemplary server for use in the exemplary variable-step authentication system of FIG. 1, according to embodiments of the present disclosure.

FIG. 2 illustrates a block diagram of authentication server 200, according to embodiments of the present disclosure. In an embodiment, authentication server 200 represents an exemplary embodiment of authentication server 120 of FIG. 1. Authentication server 200 includes but is not limited to processing subsystem 201 and database 207. Processing subsystem 201 includes one or more processors, computers, or servers identified as subsystems and can be constructed as individual physical hardware devices, or as virtual devices, such as a virtual server. The number of processing subsystems can be scaled to match the number of simultaneous user connections desired to be supported by a variable-step authentication system such as variable-step authentication system 100 of FIG. 1. Processing subsystem 201 includes but is not limited to communication subsystem 202, authentication subsystem 203, billing subsystem 204, and profile subsystem 205.

In some embodiments, communications subsystem 202 controls the routing of communications related to communications between communication devices 110 and outside communication devices 130. Communications subsystem 202 performs signal switching required to electrically connect communication devices 110 within the controlled environment to outside communication devices 130 that allow users operating such devices to communicate. Communications subsystem 202 can further record conference sessions including metadata associated with the conference sessions such as time of sessions and participants involved in the conference sessions.

In some embodiments, communications subsystem 202 also controls the establishment of communications within variable-step authentication system 100. Communications subsystem 202 performs functions related to managing communication requests from communication devices 110 and outside communication devices 130 and managing requests from communication devices 110 and communication devices 130 to manage profiles associated with participants operating these devices. Managing communications requests includes, but is not limited to, receiving requests from communication devices 110, receiving requests from outside communication devices 130, and performing the appropriate processing of such requests to determine whether to establish the requested communications including determining whether participants are authorized to participate in any communications and participate in any communications involving other specific participants. Processing the requests can further include routing the request to authentication subsystem 203 to determine whether the inmate involved in the request is authorized to initiate or otherwise participate in the communications and to generate the appropriate participant-specific authorization procedures to be transmitted to the requested communication device.

In some embodiments, communications subsystem 202 also monitors ongoing conference calls to determine whether to initiate further authentication procedures. Communications subsystem 202 monitors participants during the communication (e.g., emails, SMS texts, video call, telephonic call) and determines the appropriate action if a an unauthorized participant is detected. For example, if, during a telephone call, communications subsystem 202 detects a change in the voice of one of the participants, communications subsystem 202 performs an identity check of the new voice to insure that it belongs to a participant who was authorized when the call was first initiated. A confidence value is assigned to the identity check based on the certainty of the new voice and the identified participant. If the confidence measure is below a certain threshold, communications subsystem 202 will cause authentication subsystem 203 to initiate additional authentications procedures to confirm the identity of the participants.

In some embodiments, communications subsystem 202 also tracks communication devices within the controlled environment. In some embodiments, communications subsystem 202 tracks all communication devices currently active in a network of controlled environment as well as the inmates that have signed into each communication device. For example, communications subsystem 202 can associate the network information (e.g., IP address, MAC address, device identifier) of the communication device with inmate information (e.g., inmate identifier, inmate user name).

In some embodiments, authentication subsystem 203 performs authentication functions for establishing communications within variable-step authentication system 100. Authentication subsystem 203 is responsible for generating participant-specific authentication procedures based on a trust level associated with each participant who wishes to establish the communication. Trust levels are associated with each participant and are generated by authentication server 200 or another device associated with the controlled environment. Trust levels are based on, for example, the type of criminal offense (if the participant is an inmate), previous actions of the participant with regard to past authentication procedures, another participant who is involved in the communication, any other information that the controlled environment has stored with regard to the participant's history in previous communications, and a value assigned by the controlled environment. Examples of previous actions of the participant include but are not limited to whether the participant has successfully passed previous authentication procedures, whether the participant has failed any previous authentication procedures, and whether participant has been involved in any suspicious activity in previous communications.

Trust levels represent the level of trust that the controlled environment places on the particular participant and can be expressed as a value or metric that is compared to threshold values for determining a number of authentication steps to be included in a participant-specific authentication procedure. In some embodiments, the trust level also indicates the type of authentication steps to be issued to the participant. For example, a participant with a high level of trust will receive certain types and a certain number of authentication steps compared to a participant with a lower level of trust that Table 1.1 below illustrates an exemplary relationship between the trust levels and the number of authentication steps.

TABLE 1.1

| Trust Level | Number of Authentication Steps | Type of Authentication Steps (Challenges) |
| --- | --- | --- |
| 76%-100% | Two | Username/password, SMS response |
| 51%-75% | Three | Username/password, SMS response, challenge question(s) |
| 26%-50% | Four | Username/password, SMS response, challenge question(s), email response |
| 11-25% | Five | Username/password, SMS response, challenge question(s), email response, biometric voice |
| 0-10% | Six | Username/password, challenge question(s), SMS response, email response, biometric voice, biometric facial |

The metrics above for the trust level, the assigned numbers to each trust level, and the assigned types of authentication steps are merely exemplary. It is understood that the trust level can be represented using any type of value or metric that indicates varying degrees of trust to the controlled environment. In some embodiments, trust levels are determined exclusively based on information—such as a participant's name, participant's calling history, personal allowed number (PAN) list, blacklist—provided in a profile associated with the participant.

In some embodiments, a response to an authentication step is deemed to be successful based on the type of authentication step, are typically associated with information stored in profiles associated with the participant, and also are identified as appropriate by administrators of the controlled environment and/or authentication server 200. For example, a successful response to a username/password step is the username/password associated with the participant (and identified in the profile). A successful response to an SMS challenge includes one of several expected responses identified by controlled environment such as an SMS response that includes billing or identification information to authorize payment for the communication, an SMS response that includes an alphanumeric value (provided in an SMS message from authentication server 200), or an email message from an email address approved by the controlled environment that includes an alphanumeric value (provided in an SMS message).

In some embodiments, an SMS response authorization step includes messages sent to the participant that include but are not limited to an alphanumeric code or a request for authorization to pay for the communication. A successful response to the SMS response authorization step may be to provide the alphanumeric code back to authentication server 200 in the form of an SMS message, an email message sent from an email address associated with the participant that has been approved for use by authentication server 200, or spoken back verbally over a communication that is being monitored by communications subsystem 202.

In some embodiments, trust levels are dynamically updated based on real-time actions performed by the participant. For example, trust levels are updated based upon a successful or unsuccessful attempt to respond to a challenge. In some embodiments, trust levels are manually updated by administrators of the controlled environment. For example, in response to a participant's behavior or actions within the controlled environment that can be input by the administrators to affect the trust level. In this manner, the administrators would update a profile associated with the participant (e.g., by entering in the actions such as a fight) and profile subsystem 205 (discussed below) would update the trust level based on the information in the participant's profile.

Because each participant involved in a communication could have different trust levels, the authentication procedures for each participant could also be different. One participant may be required to successfully respond to three authentication steps and another participant may be required to successfully respond to two authentication steps. Moreover, authentication procedures may vary between each participant because the types of authentication steps that each participant must respond to also can be different based on, for example, the trust levels of each participant and a random selection of the type of authentication steps that each participant is to perform. For example, if a participant has a trust level between 26%-50% as indicated in Table 1.1 above, the participant will face four authentication steps and these steps can be selected from a group of challenges including any combination of username/password, an SMS response, challenge question(s), and an email response. For example, authentication subsystem 203 may select username/password, two challenge questions, and an SMS response as the authentication procedure for the participant.

In some embodiments, authentication (based on trust level) can be performed on one participant and conventional authentication (not based on trust level) can be performed on another participant. For example, one participant may only be required to enter in a username/password but another participant to the communication may be authenticated based on trust level according to the description above. This one-sided trust-level authentication may be based on, for example, whether a communication device is capable of performing any of the authentication steps, the identity of the participant, or a specific option selected by authentication server 200 and/or the controlled environment.

In some embodiments, responses provided by participants during an authentication procedure may include a response that represents and authorization from the participant to pay for the communication. One example of such a response includes premium SMS messages. Billing subsystem 204 determines the cost of a requested communication, manages billing accounts of participants, and, upon receiving a response authorizing payment, organizes the payment of a requested communication from the appropriate billing account associated with the participant that sent the authorization. As one example, one embodiment of an authentication step is an SMS message that is sent to the communication device of the participant. In some embodiments, the SMS message requests the participant to reply to the SMS with an authorization to pay for the communication using a billing account associated with the participant. One example of an authorization to pay includes but is not limited to the user responding with a message, such as an SMS response or an email message, that includes the user's permission (such as a password associated with the billing account or any identifier associated with the billing account that links the participant to the billing account).

In some embodiments, profile subsystem 205 manages profiles of participants that can be involved with communications within variable-step authentication system 100. As noted above, profile subsystem 205 updates trust levels associated with participant and stores the trust levels in the associated profiles. In some embodiments, profile subsystem 205 generates and updates trust levels based on information stored in the profiles and/or based on direct input from administrators associated with the controlled environment. For example, administrators can directly override a dynamically generated trust level when appropriate. Information stored in the profiles that are relevant to trust levels include but are not limited to the participant's name (to allow for identification), participant's calling history, participant's authentication history, and any flags set by the controlled environment or by authentication subsystem where flags indicate any potentially suspicious behavior or actions taken by the participant.

Profile subsystem 205 also receives and implements preferences from inmates regarding communications including but not limited to managing outside contacts on a PAN list. In some embodiments, trust levels of can also be based on the outside contacts in the PAN list, such as if any of the outside contacts are known to variable-step authentication system 100 and have low trust levels. There are profiles for outside contacts who are registered with variable-step authentication system 100. In some embodiments, outside contacts are only permitted to be involved with communications if they are registered. Registering includes establishing a billing account that allows for the participant (either residing in the controlled environment or outside of it) to pay for requested communications. Profiles also include, options established by participants as to whether payment for communications can be included as party of authentication procedures such as through a premium SMS that is sent by the participant in response to an SMS response authorization step. Accordingly, profile subsystem 205 also manages requests from participants to manage their associated profiles. As previously mentioned, the profile includes preferences associated with communications that are established involving the participant associated with the profile, trust levels, as discussed above.

In some embodiments, profiles of participants also include email addresses and telephone numbers that are approved for use by the controlled environment within variable-step authentication system 100. For example, as part of the registering process, a participants may be required to provide a list of email addresses and telephone numbers that the participant may use in communications. The controlled environment and/or authentication server 200 approves or denies their use based on verifying that the provided email addresses and telephone numbers are associated with the participant. Profiles may also include device identifiers such as media-access control (MAC) addresses or IP addresses associated with devices that have been approved for use within variable-step authentication system 100. For example, as part of the registration step, authentication server 200 requires participant to transmit a message that includes the device identification information. Authentication server extracts the device identification information from the message, verifies that the device identification information is associated with the participant, and stores it as part of the participant's profile. In some embodiments, association of device identification information with the participant is done passively such as through analyzing previous emails or messages transmitted by the participant and extracting the device identification information from these emails.

Database 206 includes any number of databases and/or servers, and stores and organizes data in a relational database. Database 206 runs a database management system, such as MYSQL™, to provide an example. Database 206 stores inmate-specific information regarding the content associated with each inmate and subject to administrative rules associated with the inmate, the communication device to which the inmate has signed in, and/or the specific content. Database 206 further stores administrative rules that are utilized by authentication server 200 and monitoring system 104 to monitor and manage conference calls within the controlled environment. As previously discussed, administrative rules can be apply to inmates as an inmate specific rule or a global rule, to devices as a device specific rule, a device type rule, or a global rule, and to content as a content specific rule, a content type rule, and a global rule. Administrative inmate rules can be associated with an inmate (or inmates) and either allow or restrict access to a conference call function based on the identity of the inmate. Examples of administrative inmate rules include but are not limited to restricting or limiting the inmate's access to the conference call function, restricting or limiting contacts that can be added to the inmate' conference PAN list, and restricting or limiting a conference call (e.g., time restriction).

Database 206 further stores all conference calls that occur within variable-step authentication system 100. The stored conference calls may be later analyzed or provided to a monitoring system, such as monitoring system 140, for later analysis. Database 206 also includes biometric and authentication information of all inmates within the controlled environment. Moreover, database 206 can also include biometric information of any outside party approved to participate in the conference call function within the controlled environment.

Exemplary Variable-Step Authentication System Operation

Exemplary usage of variable-step authentication system 100 in a controlled environment will be described with respect to FIGS. 3 and 4. The exemplary usage described in FIGS. 3 and 4 can be performed by processing logic that can comprise hardware (e.g., circuitry, dedicated logic, programmable logic, microcode, etc.), software (e.g., instructions executing on a processing device), or a combination thereof. For illustrative purposes, FIGS. 3 and 4 are described with respect to FIGS. 1 and 2 but are not limited to these example embodiments.

Figure 3:
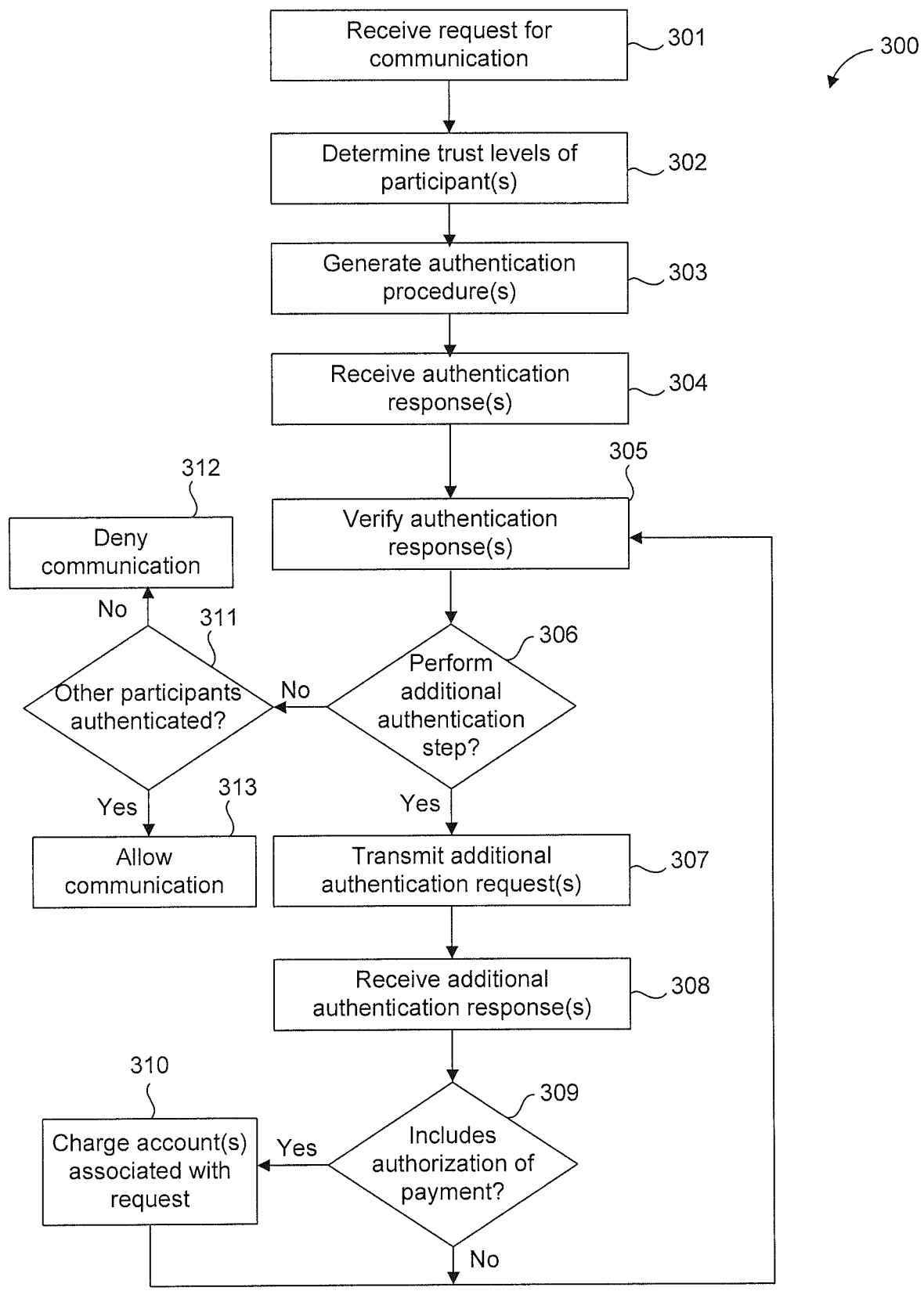
FIG. 3 illustrates a flowchart diagram of an exemplary method of a variable-step authentication process for responding to a communication request, according to embodiments of the present disclosure.
Figure 4:
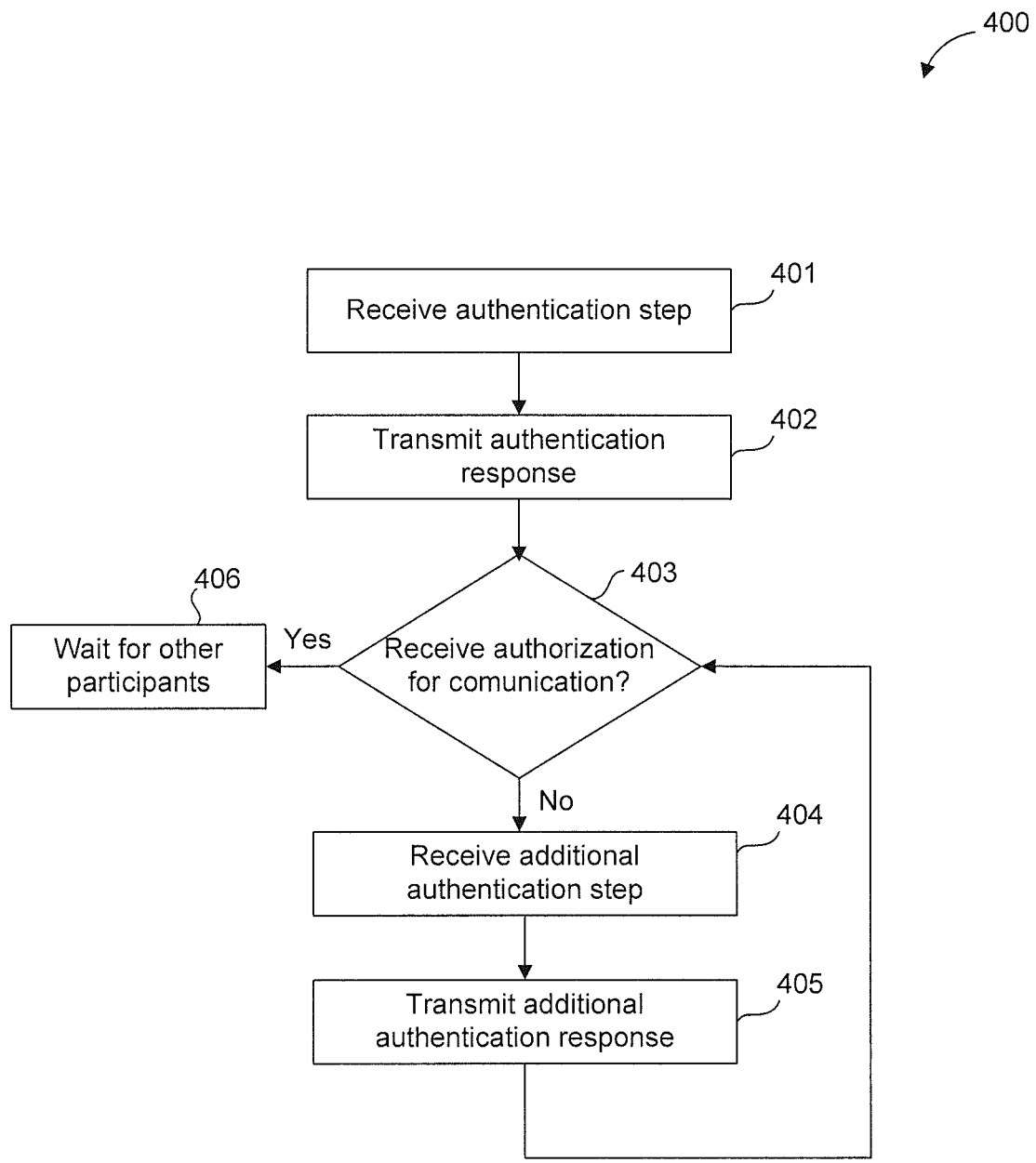
FIG. 4 illustrates a flowchart diagram of an exemplary method of a variable-step authentication process for initiating a communication, according to embodiments of the present disclosure.

FIG. 3 illustrates a flowchart diagram of an exemplary method of a variable-step authentication process for responding to a communication request, according to embodiments of the present disclosure. Method 300 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 3, as will be understood by a person of ordinary skill in the art. Some steps can be combined with steps of methods from other figures and performed as a single step. Method 300 can be performed by authentication server 200.

In 301, authentication server 200 receives a request to establish a communication between communication devices, such as communication devices 110 and outside communication devices 130. The request may be received from any or each communication device that are to be involved in the communication. In some embodiments, the request includes identification of the participants to be involved in the communication. Examples of identification include but are not limited telephone numbers of the communication device, approved email addresses associated with the participants, and device identification information of the communication device(s) to be involved in the call.

In some embodiments involving real-time communications such as a telephone call, authentication server 200 will initiate the communication between the participants solely to allow authentication server 200 to communicate with all participants to perform the variable-step authentication method described herein. However, authentication server 200 would prevent any communication (e.g., muting the call) from taking place until after participants have been authenticated as described further below. In some embodiments involving non-real-time communications such as an email message, authentication server 200 will perform the variable-step authentication method described herein prior to delivering the non-real-time communication.

In 302, authentication server 200 determines trust levels of participants that are to be involved in the requested communication. In some embodiments, this determination is performed based on the identification received as part of the request by retrieving profiles associated with the participants. In some embodiments, the trust levels are stored as metrics in the profiles. In other embodiments, the trust levels are dynamically generated for each request based on information in the profile and any other parameters specified by the controlled environment. In some embodiments, not every participant will have a trust level or will be required to be authenticated based on their trust level. This determination may be based on any number of factors including a specific option selected by authentication server 200, an identity of the participant, and/or the type of communication device used by the participant.

In 303, for each participant identified in the request or alternatively for each participant who is to receive authentication based on trust-level, authentication server 200 generates authentication procedures based on the determined trust levels. As noted above, authentication procedures includes a number of authentication steps that is based on the determined trust levels. Moreover, the types of authentication steps can be selected randomly from a group of authentication steps that is based on the determined trust levels. In some embodiments, the minimum number of authentication is steps is two. For each generated authentication procedure associated with a particular participant and for each participant who is to undergo authentication based on the trust level, authentication server 200 transmits the first authentication step from the authentication procedure generated for the particular participant to the respective communication device (associated with the participant).

In 304, authentication server 200 receives an authentication response from each respective communication device in response to transmitting the first authentication step. In 305, authentication server 200 verifies each authentication response by determining whether they are appropriate or correct responses to the respectively transmitted first authentication step. Whether each response is appropriate or correct is based on the associated authentication step (i.e., whether it is a username/password, SMS response, or biometric challenge), as discussed above. In some embodiments, if at least response is not verified, then the request for communication is rejected because one participant in the communication was not authenticated. In other embodiments, the communication may be still allowed between other participants who have been authenticated but without the participant who provided the improper response.

If the request is verified, then in 306, authentication server 200 determines whether there are any additional authentication steps to be performed as part of the authentication procedure for each participant. In 307, in response to determining that there are additional authentication steps to be performed as part of the authentication procedure, authentication server 200 transmits the next authentication step identified in the authentication procedure to the respective participant. For example, if the authentication procedure includes two steps, then authentication server 200 sends the second authentication step identified in the authentication procedure. In 311, if there are no additional authentication steps for a particular participant, that participant waits until all other participants have been authenticated.

In 308, authentication server 200 receives another authentication response from each participant in response to the transmission of the next authentication step from 307. In 309, authentication server 200 determines whether any previously received responses from each participant includes an authorization to pay for the communication, such as through a premium SMS or a message that includes billing authorization information. If so, in 310, authentication server 200 determines whether there is a billing account associated with the participant identified changes the appropriate billing account. The existence of a billing account within variable-step authentication system 100 serves as a form of verification since it indicates that the participant has registered (and provided appropriate billing information).

Method 300 then returns to and repeats 305 to verify the received authentication responses as described above and 306 to determine whether any additional authentication steps are to be performed. If an authentication procedure associated with a participant has any remaining authentication steps that require responses, then method 300 repeats 307-309 for that particular authentication procedure.

In 312, the requested communication is denied if a participant identified in the request is not authenticated. For example, in communications involving two participants, both participants are to be authenticated in order to allow for the requested communication to be initiated. In communications involving three or more participants, in some embodiments, the requested communication is denied if at least one participant fails to be authenticated. In other embodiments, the requested communication is denied only to the participant(s) who failed to be authenticated.

In 313, in some embodiments, the requested communication is allowed if all participants have been authenticated. For example, in communications involving two participants, both participants are to be authenticated in order to allow for the requested communication to be initiated. In communications involving three or more participants, in some embodiments, the requested communication is allowed if all participants are authenticated. In other embodiments, the requested communication is allowed only to the participants who were authenticated even if at least on participant is not authenticated.

FIG. 4 illustrates a flowchart diagram of an exemplary method of a variable-step authentication process for initiating a communication, according to embodiments of the present disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 4, as will be understood by a person of ordinary skill in the art. Some steps can be combined with steps of methods from other figures and performed as a single step. In some embodiments, method 400 is performed by any of communication device 110 or outside communication device 1130.

In 401, communication device 110 receives an authentication step from authentication server 200. In some embodiments, communication device 110 has transmitted a request to authentication server 200 to initiate a communication and is receiving the authentication step in response to the request. In some embodiments, communication device 110 is identified in a request for communication, and the authentication server 200 is contacting communication device 110 in order to perform variable-step authentication to determine whether to initiate the communication. The communication could be for a telephone call, a conference call, a video conference call, an email message, or an SMS message, just to name a few examples.

In 402, communication device 110 transmits an authentication response to authentication server 200 in response to the received authentication step. In some embodiments, the authentication response is manually provided by the participant manipulating the communication device 110 such as by inputting an alphanumeric value into an SMS message, an email, or providing biometric information (e.g., fingerprint, facial information, voice recognition).

In 403, communication device 110 determines whether it has received an authorization from authentication server 200 to participate in the communication. In some embodiments, the authorization from authentication server 200 is based on the number of authentication steps to be performed by the participant (e.g., whether the participant is be authenticated under conventional, one-step means or under variable-step authentication based on a trust level associated with the participant). In 406, communication device 110 has received authorization for the communication and waits for the remaining participants in the communication to be authenticated and receive authorization for communication from authentication server 200.

In 404, communication device 110 has not received an authorization for communication which indicates that there are additional authentication steps in the authentication procedure associated with the participant, and receives the additional authentication step from authentication server 200. In 405, communication device 110 transmits an additional authentication response based on the received additional authentication step. Steps 403-405 are then repeated as necessary as described above.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 5:
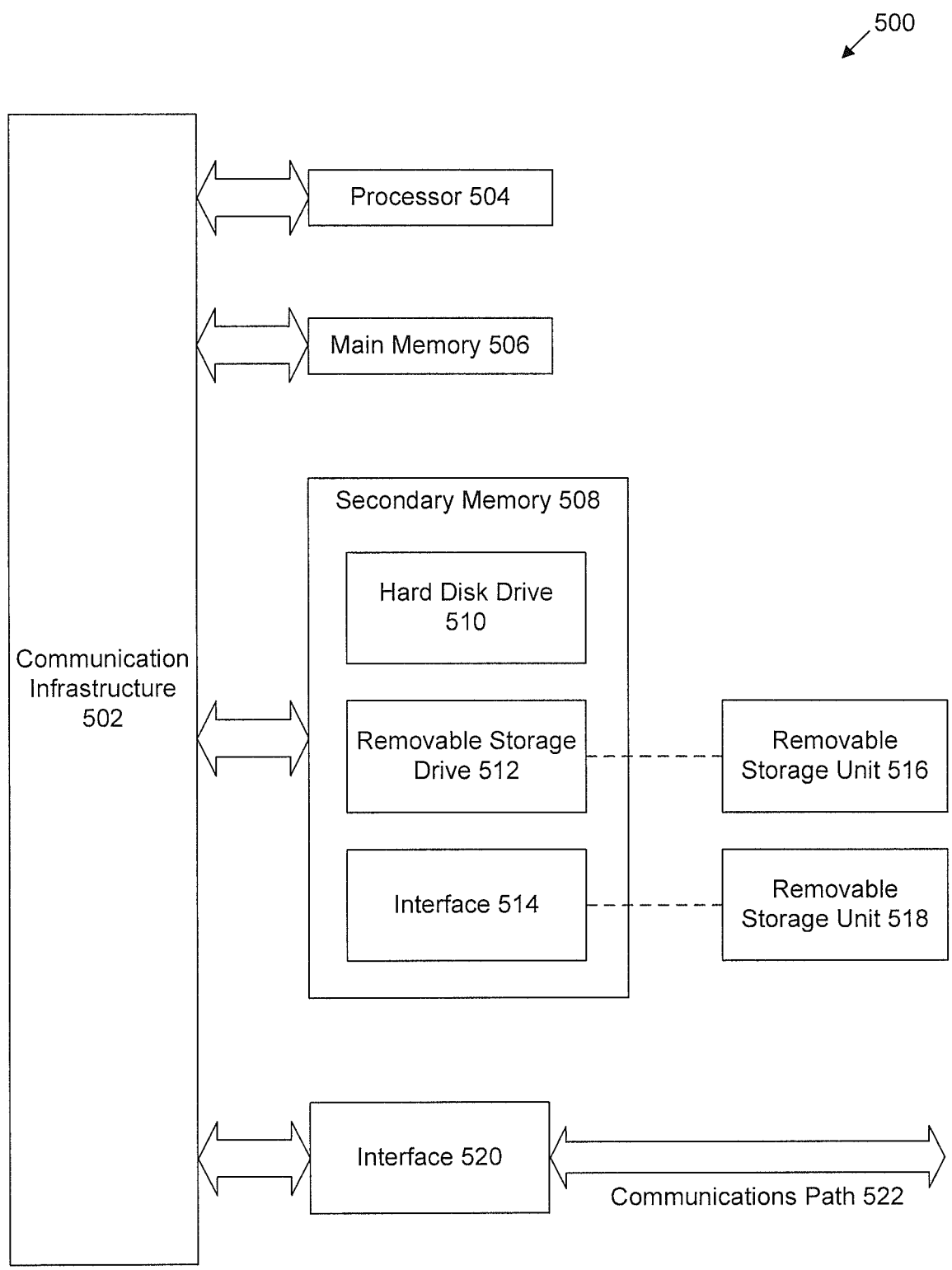
FIG. 5 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 3 and 4 can be implemented in the environment of one or more computer systems or other processing systems. An example of such a computer system 500 is shown in FIG. 5. One or more of the modules depicted in the previous figures can be at least partially implemented on one or more distinct computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510.

These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for variable-step authentication at a server, comprising:
   receiving, from a communication device, a request for a communication involving the communication device in a controlled environment;
   determining a trust level associated with a participant of the communication device;
   establishing an authentication procedure for the communication based on the trust level associated with the participant, wherein the authentication procedure indicates authentication steps to be completed by the participant, wherein the authentication steps include a first authentication step and a second authentication step;
   selecting the authentication steps based on the trust level;
   transmitting, by the server, the authentication procedure to the communication device prior to initiating the communication, wherein transmitting the authentication procedure comprises:
      transmitting, by the server, the first authentication step to the communication device; and
      responsive to receiving a first response to the first authentication step, transmitting the second authentication step to the communication device; and
   updating the trust level based on at least one of the first response and a second response to the second authentication step, wherein updating the trust level comprises adding another authentication step or removing at least one of the authentication steps from the authentication procedure.

2. The method of claim 1, further comprising:
   verifying the first response;
   receiving the second response to the second authentication step; and
   verifying the second response.

3. The method of claim 2, wherein in response to verifying the first response and the second response, determining that at least one of the first response and the second response include an authorization of payment for the communication.

4. The method of claim 1, wherein the first authentication step and the second authentication step are selected from: a biometric challenge, a password challenge, or a confirmation challenge.

5. The method of claim 1, wherein the authentication steps includes more than two authentication steps.

6. The method of claim 1, wherein the trust level is provided by the controlled environment and based on at least one of authentication history of the participant, a second participant that is involved in the communication, or a profile of the participant provided by the controlled environment.

7. The method of claim 1, wherein the communication involves a second participant, further comprising:
   determining a second trust level associated with the second participant; and
   transmitting a second authentication procedure based on the second trust level to the second participant.

8. A server for performing variable-step authentication, comprising:
   a memory; and
   a processor coupled to the memory, the processor configured to:
      receive a request for a communication involving a first communication device in a controlled environment and a second communication device outside of the controlled environment;
      determine a first trust level associated with a first participant of the first communication device;
      determine a second trust level associated with a second participant of the second communication device;
      establish a first authentication procedure for the communication based on the first trust level associated with the first participant, wherein the first authentication procedure comprises a first number of authentication steps to be completed by the first participant;
      establish a second authentication procedure for the communication based on the second trust level associated with the second participant, wherein the second authentication procedure comprises a second number of authentication steps to be completed by the second participant;
      transmit the first authentication procedure to the first communication device by separately transmitting each authentication step of the first number of authentication steps;

transmit the second authentication procedure to the second communication device by separately transmitting each authentication step of the second number of authentication steps; and updating the first trust level based on receiving a response to at least one authentication step in the first authentication procedure, wherein updating the first trust level comprises changing the first number of authentication steps in the first authentication procedure.

9. The server of claim 8, wherein the first number of authentication steps is different from the second number of authentication steps.

10. The server of claim 8, wherein the first number of authentication steps and the second number of authentication steps are at least two.

11. The server of claim 8, wherein the first trust level and the second trust level are provided by the controlled environment, the first trust level is based on at least one of authentication history of the first participant, an identity of the second participant, or a profile of the first participant, and the second trust level is based on at least one of authentication history of the second participant, an identity of the first participant, or a profile of the second participant.

12. The server of claim 11, wherein the processor is further configured to:
   authenticating the first participant based on responses received to the first authentication procedure;
   authenticating the second participant based on responses received to the second authentication procedure; and
   in response to authenticating the first and second participant:
      updating the second trust level; and
      initiating the communication.

13. The server of claim 8, determining that at least one of the responses received to either of the first authentication procedure and the second authentication procedure includes an authorization of payment for the communication.

14. The server of claim 8, wherein the first authentication step and the second authentication step are selected from: a biometric challenge, a password challenge, or a confirmation challenge.

15. The method of claim 1, wherein the first response and the second response include information selected from: biometric information, a password, and alphanumeric sequence.

16. The method of claim 1, wherein the first response and the second response are selected from: an email message, an short message service (SMS) message, and a biometric response.

17. The method of claim 1, wherein the trust level is generated in response to receiving the request.

18. The method of claim 1, wherein the another authentication step is added to the authentication procedure in response to a decrease in the trust level when updating the trust level based on at least one of the first response and the second response.

19. The method of claim 7, wherein the trust level and second trust level are provided by the controlled environment, the trust level is based on at least one of authentication history of the first participant, an identity of the second participant, or a profile of the first participant, and the second trust level is based on at least one of authentication history of the second participant, an identity of the first participant, or a profile of the second participant.

* * * * *